United States Patent

Golitz et al.

[15] 3,673,233
[45] June 27, 1972

[54] SILYL-SUBSTITUTED CARBAMIC ACID DERIVATIVES

[72] Inventors: Hans Dietrich Golitz, Koeln-Stammheim; Walter Simmler, Odenthal-Schlinghofen, both of Germany

[73] Assignee: Farbenfabriken Bayer Aktiengesellschaft, Leverkusen, Germany

[22] Filed: Dec. 2, 1969

[21] Appl. No.: 881,622

[30] Foreign Application Priority Data

Dec. 4, 1968 Germany.....................P 18 12 564.9

[52] U.S. Cl..................260/448.2 N, 117/123 C, 117/124 F, 252/357, 260/46.5 E, 260/46.5 G, 260/46.5 Y, 260/448.2 B, 260/448.2 E, 260/448.8 R
[51] Int. Cl.........................................................C07f 7/18
[58] Field of Search.............260/448.2 R, 448.2 E, 448.2 N, 260/448.2 B

[56] References Cited

UNITED STATES PATENTS

| | | | |
|---|---|---|---|
| 3,494,951 | 2/1970 | Berger | 260/448.2 N |
| 3,518,288 | 6/1970 | Haluska | 260/448.2 N |
| 3,541,031 | 11/1970 | Boudreau | 260/448.2 N X |
| 3,567,753 | 3/1971 | Delaval et al. | 260/448.2 N |

OTHER PUBLICATIONS

Noller, " Chemistry of Organic Compounds," 3rd Ed., W. B. Saunders Company, Philadelphia (1965), p. 338.

*Primary Examiner*—Tobias E. Levow
*Assistant Examiner*—P. F. Shaver
*Attorney*—Burgess, Dinklage & Sprung

[57] ABSTRACT

New organosilyl-modified carbamic acid esters have the formula

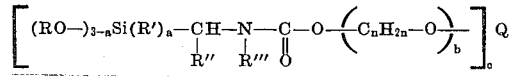

in which R, R' and R''' are monovalent hydrocarbon radicals, R'' is a hydrogen atom a methyl radical or a phenyl radical, Q is a monovalent to hexavalent hydrocarbon radical having up to 6 carbon atoms, $a$ is 0, 1, 2 or 3, $n$ is 2, 3 or 4, $b$ is zero or an integer from 1 to 200, and $c$ is the valency number of Q.

These carbamic acid derivates are prepared by reacting at a temperature of from 20° to 150° C., an aminomethyl-silane derivative of the formula

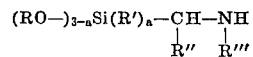

with a chloroformic acid ester of the formula

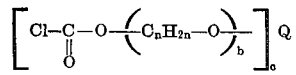

in the presence of a tertiary amine.

The products are to be used as priming agents imparting adhesion to synthetic resins on siliceous surfaces, as surfactants and as intermediates for organo-polysiloxane resins.

6 Claims, No Drawings

SILYL-SUBSTITUTED CARBAMIC ACID DERIVATIVES

The present invention relates to certain new carbofunctional organosilanes. These compounds can be regarded as carbamic acid esters having the general formula

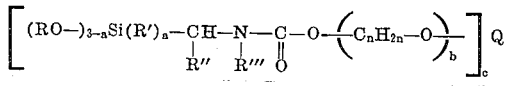

in which
R is an alkyl or cycloalkyl radical having up to six carbon atoms or a phenyl radical,
R' is an optionally halo- or cyano-substituted alkyl, cycloalkyl or aryl radical having up to 10 carbon atoms,
R'' is a hydrogen atom or a methyl or phenyl radical,
R''' is an alkyl, cycloalkyl, alkenyl, aralkyl, dialkylaminoalkyl, aryl or alkaryl radical having up to 10 carbon atoms,
Q is a monovalent to hexavalent saturated aliphatic hydrocarbon radical having up to six carbon atoms,
$a$ is 0, 1, 2 or 3,
$n$ is 2, 3 or 4,
$b$ is zero or an integer from 1 to 200,
$c$ is the valency number of Q.

The above symbols may of course vary in meaning in different positions in the molecules, while remaining within the ranges indicated above.

The invention also provides a process for the production of such a compound in which an aminomethyl-silane derivative of the formula

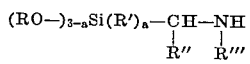

is reacted with a chloroformic acid ester of the formula

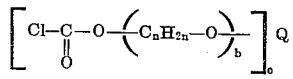

in the presence of a tertiary amine at a temperature of from 20° to 150° C., optionally in the presence of an inert solvent.

The preferred temperature for this reaction is from 50° to 120° C. The tertiary amine, for example triethylamine or pyridine, serves for binding the acid. As inert solvent, there may be used, for example, toluene or cyclohexane.

The products are suitable for use as intermediate layers imparting adhesion to siliceous surfaces with are to be coated with synthetic materials, for example polyurethanes, as interface(surface)-active agents and as intermediates for the production of organo-polysiloxane resins.

The chloroformic acid esters used for the preparation of the new products may be obtained according to known processes by reacting phosgene with hydroxyl compounds of the formula:

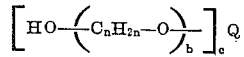

For example, the ester used in one of the following examples can be prepared as follows:

Into 700 g of a polyoxyethylene-oxypropylene-mono-n-butyl ether the structure of which corresponds on average to the formula

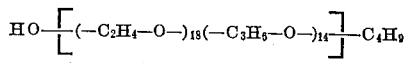

there are introduced with stirring 64 g phosgene which dissolve while the temperature rises to 35° C. The reaction mixture is subsequently heated at 80° C. for 2 hours and freed at this temperature from the excess phosgene by reducing the pressure to 12 – 14 mm Hg. This treatment is terminated when the chlorine content of the reaction mixture, as determined by repeated titration, no longer decreases. The remaining pale brown oil has, on average, the structure of a chloroformic acid polyglycol ester of the formula

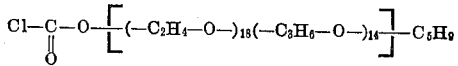

The amino-methyl-silane derivatives are likewise prepared according to a known method by reacting a chloro- or bromomethyl-silane derivative of the formula

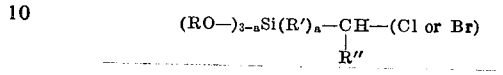

with ammonia or an amine of the formula R'''NH$_2$. Among these amines, those with boiling points above 50° C. are particularly advantageous, because they can serve not only as a component of the reaction product to be obtained but also as acid-binder and as diluent.

The amino-methyl-silane derivatives used in the following examples can be prepared in the following way:

1. A mixture of 600 g (2,83 mols) chloromethyl- triethoxy-silane and 1,680 g (17 mols) cyclohexylamine is heated at 100° C. for 2 hours, the precipitated amine salt is filtered off after cooling, and by fractional distillation of the filtrate there is obtained the N-cyclohexyl-(aminomethyl)- triethoxy-silane

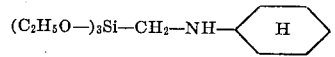

of refractive index $n_D^{20} = 1.4395$, which boils at 14 mm Hg between 145° and 150° C.

2. 227 g (1 mol) methyl-(bromomethyl)-diethoxy-silane are gradually added with stirring to 323 g (3.2 mols) cyclohexylamine; the temperature rises to about 65° C. The reaction mixture is subsequently heated at 100° C. for a further 2 hours, and the precipitated amine salt is filtered off after cooling. Fractional distillation of the filtrate gives at 1.5 mm Hg between 105° and 110° C. the N-cyclohexyl-(aminomethyl)-methyldiethoxy-silane

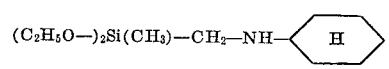

of refractive index $n_D^{20} = 1.4460$.

3. 103.5 g (0.31 mol) α-bromobenzyl-triethoxy-silane which can be prepared in known manner by bromination of benzyl-trichloro-silane and subsequent ethanolysis are added dropwise at about 60° C. to 136 g (1.86 mols) n-butylamine. The reaction mixture is then heated at boiling temperature under reflux for a further 3 hours and freed from the excess amine by reducing the pressure to 15 mm Hg and heating up to 80° C. The residue is dissolved in 100 ml anhydrous cyclohexane, the precipitated butyl ammonium bromide is filtered off, and there is obtained by fractional distillation at 0.03 mm Hg between 100° and 105° C. the α-(butylamino)-benzyl-triethoxy-silane of the formula

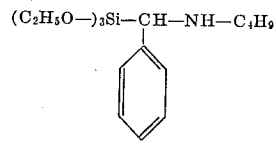

as a colorless liquid of refractive index $n_D^{20} = 1.4705$.

EXAMPLE 1

82.5 g (0.3 mol) N-cyclohexyl-(aminomethyl)- triethoxy-silane and 34 g (0.34 mol) triethylamine are dissolved in 250 cc toluene, and 28.5 g (0.3 mol) chloroformic acid methyl ester are added thereto while maintaining the temperature of the solution at between 20° and 40° C. by cooling with an ice-bath. The reaction mixture is subsequently heated at boiling temperature under reflux for 1 hour, and the precipitated triethylammonium chloride is filtered off after cooling. From the filtrate there is obtained by fractional distillation at 0.25 mm Hg between 107° and 112° C. the N-cyclohexyl-N-(triethoxy-silyl-methyl)-carbamic acid methyl ester of the formula

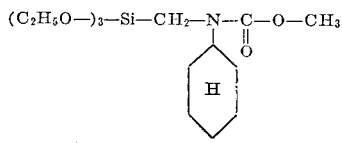

and of refractive index $n_D^{20} = 1.4505$.

EXAMPLE 2

98 g (0.4 mol) N-cyclohexyl-(amminomethyl)-methyl-diethoxy-silane and 44 g (0.44 mol) triethylamine are dissolved in 250 cc toluene, and 45.8 g (0.42 mol) chloroformic acid ethyl ester are added thereto in the course of 15 minutes. The reaction mixture is subsequently heated at boiling temperature under reflux for 1 hour, and the precipitated triethyl ammonium chloride is filtered off after cooling. By distilling the filtrate through a column, there is obtained at 0.1 mm Hg between 96° and 100° C. the N-cyclohexyl-N-(methyl-diethoxy-silyl-methyl)-carbamic acid ethyl ester of the formula

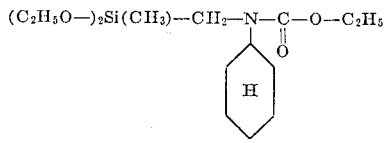

and of refractive index $n_D^{20} = 1.4562$.

EXAMPLE 3

97.3 g (0.3 mol) α-(n-butylamino)-benzyl-triethyoxy-silane and 33 g (0.33 mol) triethylamine are dissolved in 300 cc of anhydrous toluene, and 28.4 g (0.3 mol) chloroformic acid methyl ester are added thereto dropwise while limiting the temperature of the solution to not more than 40° C. by cooling. The reaction mixture is subsequently heated at 80° C. for 1 hour and the precipitated ammonium salt is filtered off after cooling. From the filtrate there is obtained by fractional distillation at 0.01 mm Hg between 158° and 163° C. the N-n-butyl-N-(α-triethoxy-silyl-benzyl)-carbamic acid methyl ester of the formula

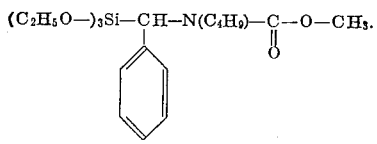

EXAMPLE 4

24.5 g (0.1 mol) N-cyclohexyl-(aminomethyl)-methyl-diethoxy-silane and 13 g (0.13 mol) triethylamine are dissolved in 100 cc toluene, and 174 g (0.1 mol) of a chloroformic acid polyglycol ester of the formula:

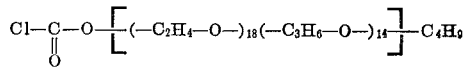

are added thereto. This reaction mixture is heated at 100° C. for 1 hour and filtered after cooling. The filtrate is heated at 0.5 mm Hg up to 100° C. to remove the solvent, and as residue there is obtained a brown oil which can be mixed with water in any proportion and the structure of which corresponds to the formula

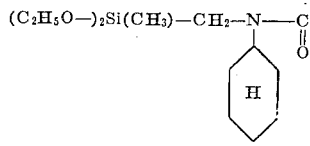

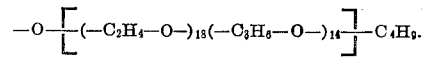

EXAMPLE 5

245 g (1 mol) N-cyclohexyl-(aminomethyl)-methyl-diethoxy-silane and 120 g (1.2 mol) triethylamine are dissolved in 1 liter of toluene, and there are added dropwise with stirring 275 g (1 gram equivalent) of the diester of octa-ethylene glycol and chloroformic acid, which substantially corresponds to the formula

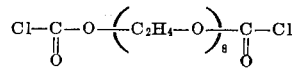

and has a chlorine content of 12.9 percent by weight and which can be prepared in known manner in analogy with the polyglycol ester of the preceding Example. During the addition of the ester, the temperature rises to 74° C. The reaction mixture is then heated at boiling temperature under reflux for 2 hours, and the ammonium salt is filtered off after cooling. The filtrate is freed from the volatile components by reducing the pressure to 0.5 mm Hg and heating up to 80° C., and there is obtained as residue a yellow clear oil the structure of which substantially corresponds to the formula

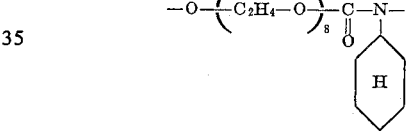

What we claim is:
1. Silyl-substitued carbamic acid derivatives of the general formula

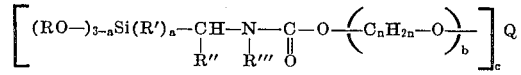

in which
R is selected from the group consisting of alkyl and cycloalkyl, having up to six carbon atoms, and phenyl,
R' is a radical having up to 10 carbon atoms, selected from the group consisting of alkyl, cycloalkyl, aryl, halogenated alkyl, cycloalkyl and aryl, and cyano-substituted alkyl, cycloalkyl and aryl,
R'' is selected from the group consisting of a hydrogen atom, a methyl radical and a phenyl radical,
R''' is a radical having up to 10 carbon atoms, selected from the group consisting of alkyl, cycloalkyl, alkenyl, aralkyl, dialkylaminoalkyl, aryl and alkaryl,
Q is a monovalent to hexavalent saturated aliphatic hydrocarbon radical having up to six carbon atoms,
$a$ is selected from 0, 1, 2 and 3,
$n$ is selected from 2, 3 and 4,
$b$ is selected from 0 and the integers from 1 to 200,
$c$ is the valency number of Q.

2. A compound according to claim 1, having the formula

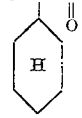

3. A compound according to claim 1, having the formula

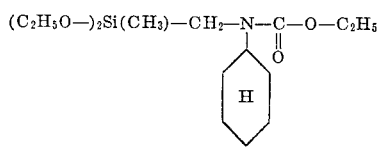
4. A compound according to claim 1, having the formula
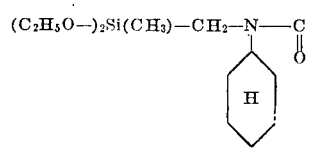
5. A compound according to claim 1, having the formula
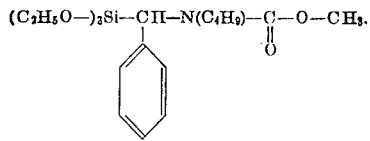
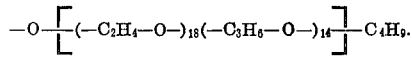
6. A compound according to claim 1, having the formula
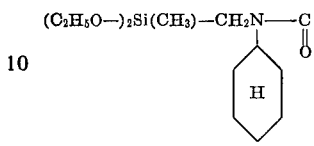
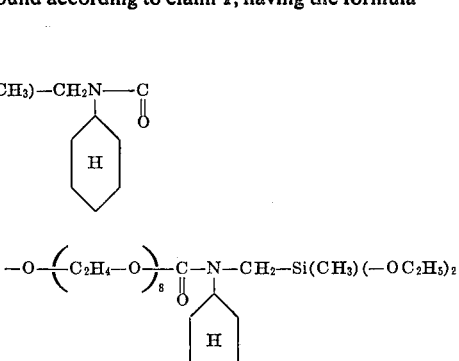
* * * * *

UNITED STATES PATENT OFFICE
CERTIFICATE OF CORRECTION

Patent No. 3,673,233     Dated June 27, 1972

Inventor(s) Hans Dietrich Golitz et al

It is certified that error appears in the above-identified patent and that said Letters Patent are hereby corrected as shown below:

<u>Col. 2, line 1</u> thyl --.

<u>Col. 3, line 37</u>

"-triethyoxy" should be -- triethoxy --.

<u>Col. 6, line 8</u>

"... —$CH_2N$— " should be -- ... —$CH_2$—$N$— --.

Signed and sealed this 27th day of February 1973.

(SEAL)
Attest:

EDWARD M. FLETCHER, JR.
Attesting Officer

ROBERT GOTTSCHALK
Commissioner of Patents